United States Patent
Ciavattone et al.

(10) Patent No.: US 8,976,689 B2
(45) Date of Patent: Mar. 10, 2015

(54) METHODS, SYSTEMS, AND COMPUTER PROGRAM PRODUCTS FOR MONITORING NETWORK PERFORMANCE

(75) Inventors: Leonard Ciavattone, Holmdel, NJ (US); William R. Halloran, Toms River, NJ (US); Alfred C. Morton, Jr., Oceanport, NJ (US); Gomathi Ramachandran, Holmdel, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 122 days.

(21) Appl. No.: 13/215,772

(22) Filed: Aug. 23, 2011

(65) Prior Publication Data

US 2013/0051252 A1 Feb. 28, 2013

(51) Int. Cl.
*H04L 12/66* (2006.01)
*H04L 12/26* (2006.01)
*H04W 24/10* (2009.01)

(52) U.S. Cl.
CPC ............... *H04L 43/10* (2013.01); *H04L 43/12* (2013.01); *H04L 43/50* (2013.01); *H04W 24/10* (2013.01); *H04L 43/04* (2013.01)
USPC ............ 370/252; 370/341; 370/457; 370/236

(58) Field of Classification Search
CPC ..... H04W 24/02; H04W 24/06; H04W 24/08; H04L 1/242
USPC ............. 370/252, 341, 457, 236, 236.1–23.2, 370/241–249, 392, 417; 340/514, 515–517; 709/204, 224–227, 238–246
See application file for complete search history.

(56) References Cited

U.S. PATENT DOCUMENTS

| | | | |
|---|---|---|---|
| 6,134,217 A * | 10/2000 | Stiliadis et al. | 370/232 |
| 6,438,376 B1 * | 8/2002 | Elliott et al. | 455/437 |
| 7,286,537 B2 * | 10/2007 | Roh | 370/392 |
| 7,835,886 B2 | 11/2010 | Vogel et al. | |
| 8,279,759 B1 * | 10/2012 | Jones | 370/248 |
| 2002/0159393 A1 * | 10/2002 | Smith et al. | 370/249 |
| 2004/0002346 A1 * | 1/2004 | Santhoff | 455/456.1 |
| 2005/0053008 A1 * | 3/2005 | Griesing et al. | 370/241 |
| 2006/0013145 A1 * | 1/2006 | Boodaghians | 370/249 |
| 2006/0203808 A1 * | 9/2006 | Zhang et al. | 370/352 |
| 2008/0304420 A1 * | 12/2008 | Deragon et al. | 370/249 |
| 2009/0046593 A1 * | 2/2009 | Ptasinski et al. | 370/252 |
| 2009/0161569 A1 * | 6/2009 | Corlett | 370/252 |
| 2009/0204715 A1 * | 8/2009 | Prakasha | 709/228 |
| 2009/0310494 A1 * | 12/2009 | Ou et al. | 370/252 |
| 2012/0051227 A1 * | 3/2012 | Grandi et al. | 370/241.1 |

OTHER PUBLICATIONS

U.S. Appl. No. 12/622,147, filed Nov. 19, 2009.

* cited by examiner

*Primary Examiner* — Dang Ton
*Assistant Examiner* — Sai Aung
(74) *Attorney, Agent, or Firm* — Hartman & Citrin LLC

(57) ABSTRACT

Network performance management includes identifying a location of a test unit, providing a test protocol to the test unit over a network, and transmitting a stream of data packets to the test unit. The network performance management also includes identifying, via the location of the test unit, a transmission path of network elements through which the stream of packets flows. The network performance management further includes tracking measurements associated with the stream of data packets transmitted to the test unit and return data packets received from the test unit. The measurements are tracked for segments associated with each of the network elements in the transmission path.

20 Claims, 3 Drawing Sheets

METHODS, SYSTEMS, AND COMPUTER PROGRAM PRODUCTS FOR MONITORING NETWORK PERFORMANCE

BACKGROUND

1. Field of the Invention

Exemplary embodiments relate generally to communications networks, and more particularly, to monitoring network performance.

2. Description of Background

Monitoring the performance of network resources for a mobile communications network can be a difficult task, particularly with respect to throughput performance. Existing techniques for testing call accessibility and reliability include performing drive-by tests in which an individual drives around an area to be monitored and performs various activities on a cellular telephone or smart phone representative of what a typical device user may perform. The quality of these activities is documented in order to assess the level of performance achieved. However, these tests generally show high variability in their results and are not easily correlated to specific network issues due to, e.g., distances between the device and the network resources and/or object interference of the radio frequency signal. In addition, the existing testing techniques typically utilize a large number of individuals and testing devices for drive-by testing in order to ensure the greatest level of performance information that covers the greatest amount of area serviced by the network is available for analysis.

BRIEF SUMMARY

Exemplary embodiments include a method for implementing network performance management. The method includes identifying, via a host system computer, a location of a test unit, providing a test protocol to the test unit over a network, and transmitting a stream of data packets to the test unit. The method also includes identifying, via the location of the test unit, a transmission path of network elements through which the stream of packets flows. The method further includes tracking measurements associated with the stream of data packets transmitted to the test unit and return data packets received from the test unit. The measurements are tracked for segments associated with each of the network elements in the transmission path.

Exemplary embodiments also include a system for implementing network performance management. The system includes a host system computer and logic executable by the host system computer. The logic is configured to implement a method. The method includes identifying a location of a test unit, providing a test protocol to the test unit over a network, and transmitting a stream of data packets to the test unit. The method also includes identifying, via the location of the test unit, a transmission path of network elements through which the stream of packets flows. The method further includes tracking measurements associated with the stream of data packets transmitted to the test unit and return data packets received from the test unit. The measurements are tracked for segments associated with each of the network elements in the transmission path.

Further exemplary embodiments include a computer program product for implementing network performance management. The computer program product includes a storage medium embedded with machine-readable computer program instructions, which when executed by a computer, cause the computer to implement a method. The method includes identifying a location of a test unit, providing a test protocol to the test unit over a network, and transmitting a stream of data packets to the test unit. The method also includes identifying, via the location of the test unit, a transmission path of network elements through which the stream of packets flows. The method further includes tracking measurements associated with the stream of data packets transmitted to the test unit and return data packets received from the test unit. The measurements are tracked for segments associated with each of the network elements in the transmission path.

Other systems, methods, and/or computer program products according to embodiments will be or become apparent to one with skill in the art upon review of the following drawings and detailed description. It is intended that all such additional systems, methods, and/or computer program products be included within this description, be within the scope of the exemplary embodiments, and be protected by the accompanying claims.

BRIEF DESCRIPTION OF DRAWINGS

Referring now to the drawings wherein like elements are numbered alike in the several FIGURES.

The detailed description explains the exemplary embodiments, together with advantages and features, by way of example with reference to the drawings.

DETAILED DESCRIPTION OF EXEMPLARY EMBODIMENTS

One or more exemplary embodiments of the invention are described below in detail. The disclosed embodiments are intended to be illustrative only since numerous modifications and variations therein will be apparent to those of ordinary skill in the art.

In accordance with exemplary embodiments, network performance monitoring for assessing the quality of data transmission over a network is provided. The network performance monitoring provides a method of testing a full mobility path for mobile communications in order to assess network performance. The mobility path specifies a transmission path including network resources through which the communications flow. The network performance monitoring provides reliable and timely measurements with minimal pre-configuration of system and network elements. These and other features of the network performance monitoring will now be described.

Figure 1:
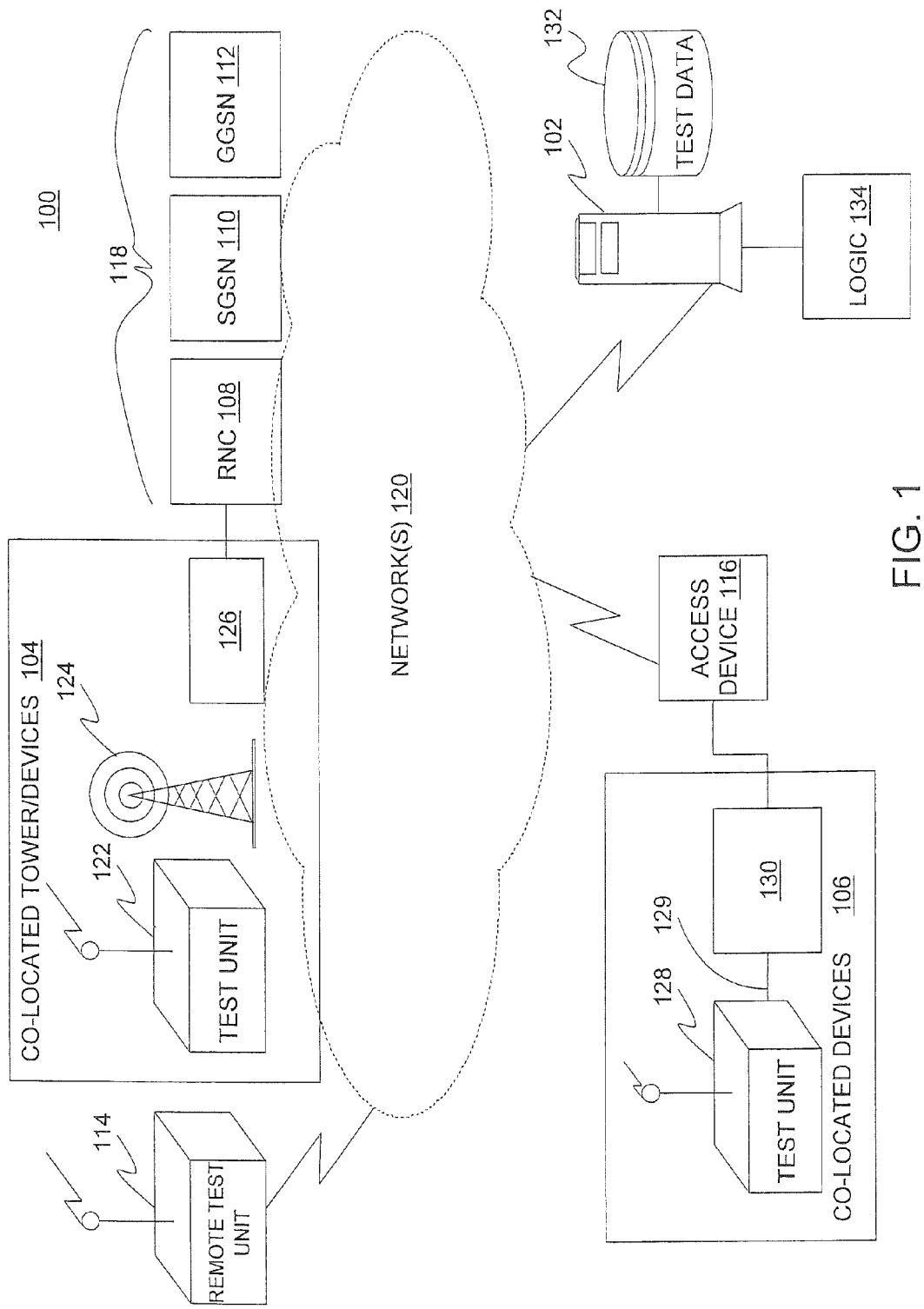
FIG. 1 illustrates a system upon which network performance monitoring may be implemented in accordance with exemplary embodiments of the present invention.

Turning now to FIG. 1 a system upon which network performance monitoring may be implemented will now be described in an exemplary embodiment. The system 100 of FIG. 1 includes a host system 102 communicatively coupled with co-located tower and devices 104, co-located devices 106, a radio network controller (RNC) 108, a serving general packet radio service (GPRS) support node (SGSN) 110, and a gateway GPRS support node (GGSN) 112 over networks 120. The RNC 108, SGSN 110, and GGSN 112 are collectively referred to herein as "network resources" 118). The host system 102 is also communicatively coupled with a remote test unit 114 and an access device 116 over one or more of the networks 120.

The host system 102 may be implemented as a high-speed computer processing device (e.g., a mainframe computer) capable of handling a high volume of activities conducted with network resources and devices. The host system 102 reflects a centralized test server that executes logic 134 for implementing the exemplary network performance monitoring. The logic 134 initiates the network performance monitoring through testing including determining when and how to group data for transmission over the networks 120, and performs analytics on the results of the testing, as described herein. Various test designs may be configured via the logic 134 as desired. A non-limiting example of a test design is shown, e.g., in FIG. 3. The host system 102 is communicatively coupled to a storage device 132 that may be used to store testing data and results generated from the implementation of the mobility measurements.

The co-located tower and devices 104 relate to the infrastructure equipment that services a tower. The co-located tower and devices 104 include a test unit 122 disposed close in proximity to a tower 124 and a router 126. For example, the test unit 122 may be disposed in an equipment building that services the tower 124 and the router 126. In an embodiment, the test unit 122 is used in implementing the network performance monitoring testing described herein. The test unit 122 receives packets, via the tower 124 and router 126, that are transmitted over the networks 120 from the host system 102. The test unit 122 processes the packets (e.g., putting a timestamp in the packet), and returns the packets over the networks 120 to the host system 102, as will be described herein. In an embodiment, the tower is a cell tower. The router 126 routes packets of data between the tower 124 and the RNC 108 and performs functions, such as formatting and conversion of the packets.

The co-located devices 106 relate to a wired configuration in which a test unit 128 is coupled to a router 130 through physical wiring 129. The test unit 128 is used in implementing the network performance monitoring described herein. The test unit 128 receives packets, via the physical wiring 129, the router 130, and the access device 116, from the host system 102 over the networks 120. Similar to the test unit 122 above, the test unit 128 processes the packets (e.g., putting a timestamp in the packet), and returns the packets over the networks 120 to the host system 102. Similar to the router 126 described above, the router 130 routes packets of data to specific destinations and performs functions, such as formatting and conversion of the packets.

The access device 116 refers to a gateway device that handles communications transmitted between the router 130 and the host system 102 over the networks 120. The access device 116 may be customer premise equipment that collects various channels of data for transmission over a shared access link to the networks 120. The access device 116 forms part of the mobility path traversed by the network traffic conducted between the test unit 128 and the host system 102.

The RNC 108, SGSN 110, and the GGSN 112 each represents general packet radio service (GPRS) network components, such as network resources 118 and the access device 116 that handle and process traffic going to and from the remote test unit 114, co-located tower and devices 104, and the host system 102. The RNC 108, SGSN 110, and GGSN 112 form part of the mobility path traversed by the network traffic conducted between the remote test unit 114, the test unit 122, and the host system 102. For example, the RNC 108 performs radio resource and mobility management of the traffic, as well as data encryption. The SGSN 110 and GGSN 112 act as interfaces between the GPRS network and external networks, such as one or more networks of networks 120. The GGSN 112 provides network access to mobile devices from other non-GPRS network devices. It maintains a record of mobile devices and the SGSN associated with the particular mobile devices, and assigns an IP address to these devices.

The exemplary mobility measurements provide radio frequency based testing through a full mobility path that includes the RNC 108, the SGSN 110, and the GGSN 112, as well as any related network components. It will be understood that the RNC 108, SGSN 110, and GGSN 112 represent a simplified depiction of the network elements that may form part of the mobility path traversed by network traffic. Other network elements may be included in this mobility path, such as routers, hubs, switches, interface components, etc. Likewise, the access device 116 also forms part of a mobility path with respect to co-located devices 106.

The test unit 114 refers to a remote device that may be used in the exemplary testing described herein. The remote test unit 114 receives packets via a servicing tower, such as tower 124, as well as router 126, from the host system 102 over networks 120. Similar to the test unit 122 above, the remote test unit 114 processes the packets (e.g., putting a timestamp in the packet), and returns the packets over the networks 120 to the host system 102.

The test units 114, 122, and 128 may be any type of communication device capable of supporting one or more data, voice, messaging, and location-based services. The test units 114, 122, and 128 may be configured to communicate over multiple network protocols. In one embodiment, the test units 114, 122, and 128 may be implemented, in part, via a small router and wireless card.

The networks 120 may include any type of network known in the art. The networks 120 may include area networks, private networks, and the Internet. The networks may include wireless networks, such as cellular, satellite and terrestrial networks. The wireless networks are referred to as GPRS networks. Communications may be conducted between the host system 102 and the remote test unit 114 and co-located tower and devices 104 via wireless transmissions, such as ultra mobile broadband (UMB), long term evolution (LTE), and IEEE 802.11, as well as via wired links, such as twisted pair link, a T1/E1 phone line, an AC line, an optical fiber line, and coaxial cable, to name a few.

As indicated above, the network performance monitoring provides a method of testing a full mobility path for mobile communications in order to assess network performance. The network performance testing requires minimal pre-configuration of system and network elements. For example, the test units (e.g., test unit 122) may be directly coupled to a co-located tower (e.g., tower 124) and the logic 134 is configured to identify the test unit 122 and to communicate with the test unit 122 over the networks 120 via the tower 124 upon connection at the co-location 104. Likewise, a remote test unit (e.g., test unit 114) accesses the nearest tower (e.g., tower 124) in order to communicate with the host system 102 via the tower 124. In another example, a test unit (e.g., test unit 128) communicates via physical wiring to an associated router (e.g., wiring 129 and router 130). The router 130 then forwards the communication to an access device (e.g., access device 116) to the host system 102 via the networks 120.

In an embodiment, the test units (e.g., test units 114, 122, and 128) are configured to periodically send signals over the networks 120 so the host system 102 can identify their presence on the GPRS network. The host system 102 is configured, e.g., via the logic 134, to initiate testing with respect to each of the test units 114, 122, 128. The test units 114, 122, 128 may be disposed in any desired location for testing. For example, the test units 114, 122, 128 may be placed co-located with a tower 124, within an office, or a telephone closet. The locations of the test units 114, 122, 128 may be static or relatively static as described herein.

In an embodiment, the host system 102 is configured to identify each of the test units 114, 112, 128. This may be implemented, e.g., by identifying the tower 124 through which the test units 114, 122, 128 communicate (e.g., either through a wired or wireless connection to the tower 124). In addition, one or more of the test devices may be disposed in a relatively fixed or permanent location to provide consistency is measurements. For example, the test unit 114, 122, 128 is disposed such that it is always in the same location relative to a tower 124 and is the same 'device.' As shown in FIG. 1, some of the test units (e.g., remote test unit 114) may be disposed further away from a tower 124 (i.e., not co-located with the tower) in order to test communications conducted over a specified distance. For example, once a remote test unit (e.g., remote test unit 114) is put in place, the logic 134 may be provided with information regarding the relative distance of the test device 114 from the nearest tower in order to better process test results (e.g., information that a test unit 114, 122, 128 is located a great distance from the nearest tower 124 or information that an obstruction between the test unit 114, 122, 128 and the nearest tower 124 exists may be used in assessing a relatively weak signal resulting from the network performance monitoring).

The exemplary network performance monitoring also simplifies the testing process by reducing the quantities of data tested without sacrificing quality through specialized test streams that capture throughput performance without using significant bandwidth. The network performance testing provides a consistent trackable estimation of throughput and other fundamental metrics from the radio frequency to a site logically near the GGSN 112, as described further herein. In addition, the network performance testing correlates performance data to particular types of towers. These and other features will now be described with regard to FIGS. 2 and 3.

Figure 2:
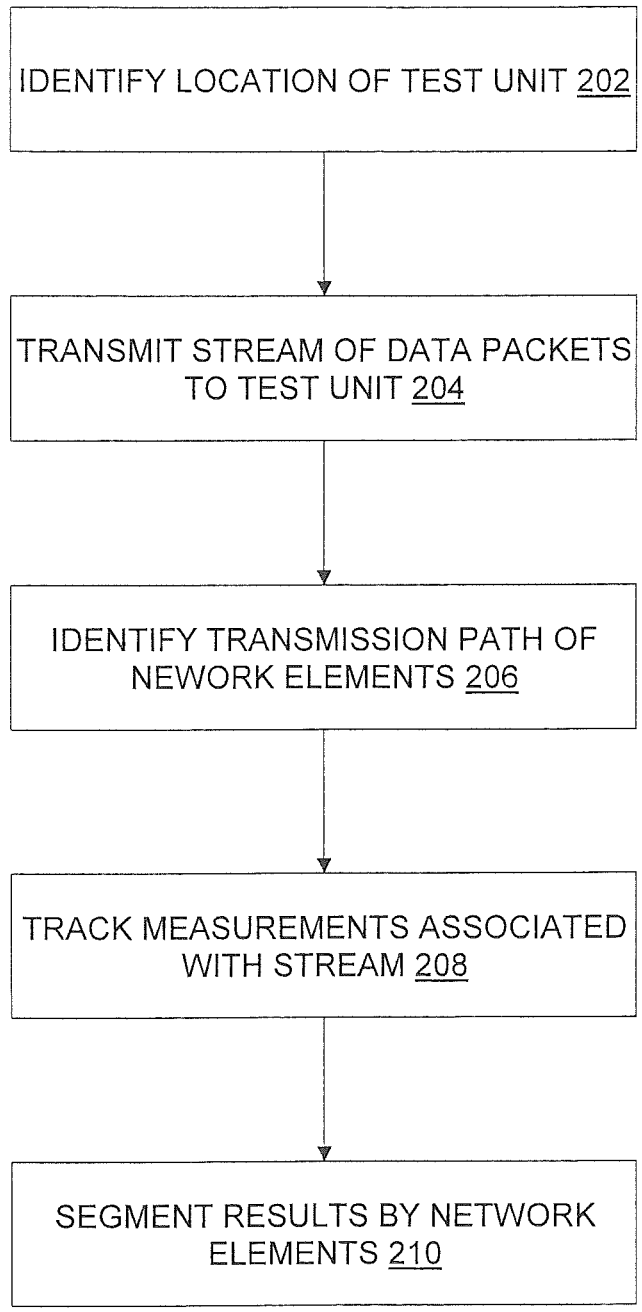
FIG. 2 illustrates a flow diagram detailing a method in which network performance monitoring may be implemented in accordance with exemplary embodiments of the present invention.

Turning now to FIG. 2, a flow diagram describing a process for implementing the network performance monitoring will now be described in an exemplary embodiment. The process described in FIG. 2 assumes that a test unit 122 has been established at a testing location (e.g., the co-located tower and devices 104 of FIG. 1), and that the test unit 122 has received a test protocol over the networks 120 from the host system 102 and has sent a signal to the host system 102 indicating its presence in the network.

At step 202, the host system 102 receives a signal from the test unit 122. The host system 102 identifies the test unit 122 from the signal and initiates testing at step 204. The testing may be initiated via the logic 134 by transmitting a stream of data packets to the test unit 122 and directing the test unit 122 to return the packets to the host system 102. The test units 114, 122, and 128 may be configured via the logic 134 with a test protocol to accept and return the packets as directed to them by the host system 120. By initiating the activities via the host system 102, there is little configuration required on the part of the individual test units. For example, the test protocols and test designs are centralized at the host system 102. Even when the test units are moved to different locations, the host system 102 can update the test units with new test protocols once the test units are deployed at their new locations.

The logic 134 identifies the transmission path of network elements (e.g., the tower 124, router 126, RNC 108, SGSN 110, and GGSN 112) through which the stream of data packets flow at step 206. The logic 134 tracks measurements in both directions (upstream and downstream) associated with the stream of data packets at step 208. The measurements may be tracked by identifying from which network elements in the transmission path the measurements are associated (e.g., the burst between network elements). Elements that may be tested include, e.g., rate of packet delivery in the downstream direction, rate of packet delivery in the upstream direction, rate for a single packet (e.g., window of 1), delay/latency for dedicated and shared channels, loss in each channel, and time for transition to dedicated channels. For each of these elements, different statistics may be collected (e.g., peak rate over a shorter window, averages, various percentiles for delay, etc.). An estimation of channel transition behavior and the way factors affect the transition may also be collected. Additionally, collected data may include management information base (MIB) data from the router in the same time period as the test that has one or more of a tower identifier, tower band, or tower signal strength characteristics (e.g., Ec/Io, RSSI, etc.). Measurements may be tracked by collecting the per-packet data from each test (e.g., via time-stamping the packets at each end of the connection, and the information is then extracted from the test packets). The per-packet data is then analyzed and extracted to provide a summarized set of data for each test that contains key metrics as well as tower characteristics.

At step 210, the results of the testing may be segmented according to sections defined for the mobility path. For example, sections may include the mobility paths defined between the test unit 122 and the tower 124, between the tower 124 and the router 126, and other network resources 118. The results may be viewed on multiple levels, such a basic performance analysis (e.g., analysis of baseline stream performance or correlation of cell tower to performance), analysis of cell tower availability to the test unit, and correlation of tower equipment to performance. In one embodiment, the results are segmented by extracting measurements taken for the communication as it transits two specified network elements. This segmentation of measurements may help to identify or isolate issues or concerns arising from any section of the mobility path, as well as issues involving individual components within the mobility path.

Figure 3:
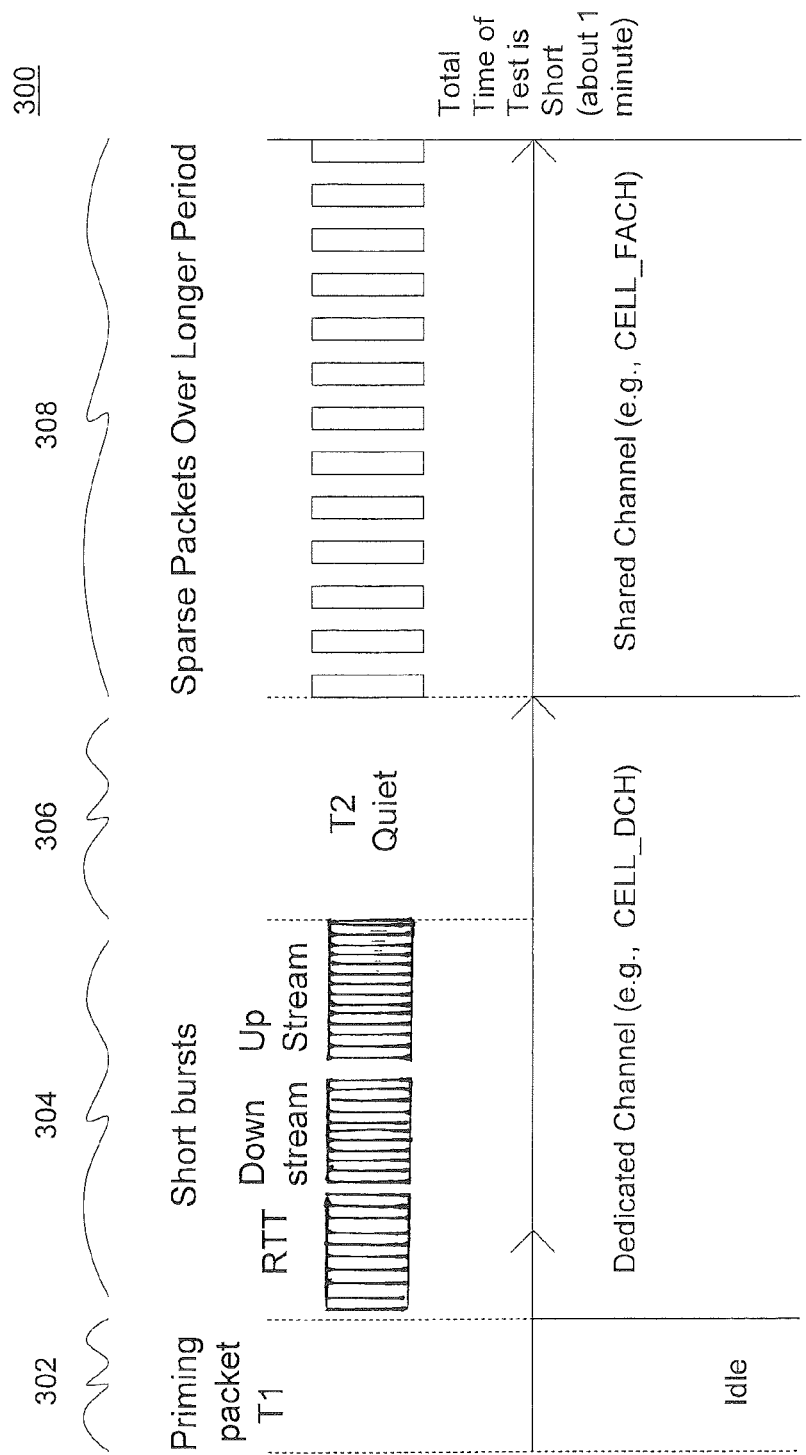
FIG. 3 illustrates a sample test design for use in implementing the network performance monitoring in accordance with exemplary embodiments of the present invention.

Turning now to FIG. 3 a sample test design 300 for a three-state measurement is illustrated in accordance with exemplary embodiments. The test design 300 includes phases for dedicated channel (DCH) activation, dedicated channel round trip time (RTT), downlink, uplink, and shared channel performance. As shown in FIG. 3, one phase 302 of the test measures the time to receipt of the first packet of data (T1), where the test unit is in an idle state. In another phase 304, the test measures the downlink rate and upload rate of the stream under test in terms of round trip time (minimum and maximum rates), loss, and burst associated with the stream. This may be achieved by sending a very short burst (e.g., less than 50) of full maximum transmission unit (MTU)-sized packets. Once the test unit is idle (inactive) 306 for a specified period of time, the test unit may be placed in a forward access channel mode in which no dedicated physical channel is allocated (i.e., a shared channel state). In this state, another phase 308 of the test measures loss, burst, round trip time (minimum, maximum, and average rates), one-way (OW) delay and OW delay variability. In total, the test performed using the test design 300 may span less than a minute, thereby minimizing the amount of network bandwidth and time used in conventional testing. Because the variables typically found in network performance testing are minimized or eliminated, for example, by keeping the placement of test units in a static location over a period of time, variances in test results associated with mobile test units are minimized, thereby providing more reliable and consistent test results, which results in a need for reduced testing.

As described above, the exemplary embodiments can be in the form of computer-implemented processes and devices for practicing those processes. The exemplary embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes a device for practicing the exemplary embodiments. The exemplary embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes a device for practicing the exemplary embodiments. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc., do not denote any order or importance, but rather the terms first, second, etc., are used to distinguish one element from another. Furthermore, the use of the terms a, an, etc., do not denote a limitation of quantity, but rather denote the presence of at least one of the referenced item.

What is claimed:

1. A method comprising:
providing, by a host system computer to a test unit, a test protocol for configuring the test unit to accept and return streams of data packets directed to the test unit by the host system computer;
receiving, at the host system computer from the test unit via a cell tower used by the test unit to communicate, a signal, the test unit disposed at a fixed location relative to the cell tower used by the test unit to communicate;
determining, by the host system computer, an identity of the cell tower used by the test unit to communicate;
identifying, by the host system computer, the test unit based on the identity of the cell tower used by the test unit to communicate;
receiving, at the host system computer, information about the test unit, the information comprising a distance of the test unit relative to the cell tower used by the test unit to communicate and an existence of an obstruction between the test unit and the cell tower used by the test unit to communicate;
transmitting, by the host system computer, a stream of data packets to the test unit;
identifying, by the host system computer, a transmission path of network elements through which the stream of data packets flows as the stream of data packets is transmitted to the test unit, wherein the network elements comprise the cell tower used by the test unit to communicate; and
tracking, by the host system computer, measurements associated with the stream of data packets transmitted to the test unit and associated with return data packets returned, by the test unit based on the test protocol, to the host system computer, the measurements tracked for segments associated with each of the network elements in the transmission path, and the information about the test unit used when assessing the measurements.

2. The method of claim 1, further comprising segmenting results of the measurements according to sections defined for the transmission path, wherein the sections comprise a section between the test unit and the cell tower used by the test unit to communicate, a section between the cell tower used by the test unit to communicate and a first router, and a section between a second router and the host system computer.

3. The method of claim 1, wherein the test unit is configured to communicate over multiple network protocols.

4. The method of claim 1, wherein the test unit is configured to support voice, data, messaging, and location-based services over a network.

5. The method of claim 1, wherein the measurements are tracked while the transmission path is in an idle state, the measurements including a time duration before a first packet of the stream of data packets is received by the test unit.

6. The method of claim 1, wherein the measurements are tracked while the transmission path is in a dedicated channel state, and the measurements tracked include:
loss;
burst;
minimum round trip time; and
maximum round trip time.

7. The method of claim 1, wherein the measurements are tracked while the transmission path is in a shared channel state, and the measurements tracked include:
loss;
burst;
minimum round trip time;
maximum round trip time;
average round trip time;
one-way delay; and
one-way delay variability.

8. A host system computer comprising:
a processor; and
logic that, when executed by the processor, causes the processor to perform operations comprising:
providing, to a test unit, a test protocol for configuring the test unit to accept and return streams of data packets directed to the test unit by the host system computer,
receiving, from the test unit via a cell tower used by the test unit to communicate, a signal, the test unit disposed at a fixed location relative to the cell tower used by the test unit to communicate,
determining an identity of the cell tower used by the test unit to communicate,
identifying the test unit based on the identity of the cell tower used by the test unit to communicate,
receiving information about the test unit, the information comprising a distance of the test unit relative to the cell tower used by the test unit to communicate and an existence of an obstruction between the test unit and the cell tower used by the test unit to communicate, transmitting a stream of data packets to the test unit, identifying a transmission path of network elements through which the stream of data packets flows as the stream of data packets is transmitted to the test unit, wherein the network elements comprise the cell tower used by the test unit to communicate, and tracking measurements associated with the stream of data packets transmitted to the test unit and associated with return data packets returned, by the test unit based on the test protocol, to the host system computer, the measurements tracked for segments associated with each of the network elements in the transmission path, and the information about the test unit used when assessing the measurements.

9. The host system computer of claim 8, wherein the operations further comprise segmenting results of the measurements according to sections defined for the transmission path, wherein the sections comprise a section between the test unit and the cell tower used by the test unit to communicate, a section between the cell tower used by the test unit to communicate and a first router, and a section between a second router and the host system computer.

10. The host system computer of claim 8, wherein the test unit is configured to communicate over multiple network protocols.

11. The host system computer of claim 8, wherein the test unit is configured to support voice, data, messaging, and location-based services over a network.

12. The host system computer of claim 8, wherein the measurements are tracked while the transmission path is in an idle state, the measurements including a time duration before a first packet of the stream of data packets is received by the test unit.

13. The host system computer of claim 8, wherein the measurements are tracked while the transmission path is in a dedicated channel state, and the measurements tracked include:
- loss;
- burst;
- minimum round trip time; and
- maximum round trip time.

14. The host system computer of claim 8, wherein the test unit is in a shared channel state, and the measurements tracked include:
- loss;
- burst;
- minimum round trip time; maximum round trip time;
- average round trip time;
- one-way delay; and
- one-way delay variability.

15. A non-transitory computer-readable storage medium embodied with computer program instructions, which, when executed by a computer, cause the computer to perform operations comprising:

providing, to a test unit, a test protocol for configuring the test unit to accept and return streams of data packets directed to the test unit by the computer;

receiving, from the test unit via a cell tower used by the test unit to communicate, a signal, the test unit disposed at a fixed location relative to the cell tower used by the test unit to communicate;

determining an identity of the cell tower used by the test unit to communicate;

identifying the test unit based on the identity of the cell tower used by the test unit to communicate;

receiving information about the test unit, the information comprising a distance of the test unit relative to the cell tower used by the test unit to communicate and an existence of an obstruction between the test unit and the cell tower used by the test unit to communicate;

transmitting a stream of data packets to the test unit;

identifying a transmission path of network elements through which the stream of data packets flows as the stream of data packets is transmitted to the test unit, wherein the network elements comprise the cell tower used by the test unit to communicate; and tracking measurements associated with the stream of data packets transmitted to the test unit and return data packets returned, by the test unit based on the test protocol, to the computer, the measurements tracked for segments associated with each of the network elements in the transmission path, and the information about the test unit used when assessing the measurements.

16. The non-transitory computer-readable storage medium of claim 15, wherein the operations further comprise segmenting results of the measurements according to sections defined for the transmission path, wherein the sections comprise a section between the test unit and the cell tower used by the test unit to communicate, a section between the cell tower used by the test unit to communicate and a first router, and a section between a second router and the computer.

17. The non-transitory computer-readable storage medium of claim 15, wherein the test unit is configured to communicate over multiple network protocols.

18. The non-transitory computer-readable storage medium of claim 15, wherein the measurements are tracked while the transmission path is in an idle state, the measurements including a time duration before a first packet of the stream of data packets is received by the test unit.

19. The non-transitory computer-readable storage medium of claim 15, wherein the measurements are tracked while the transmission path is in a dedicated channel state, and the measurements tracked include:
- loss;
- burst;
- minimum round trip time; and
- maximum round trip time.

20. The non-transitory computer-readable storage medium of claim 15, wherein the measurements are tracked while the transmission path is in a shared channel state, and the measurements tracked include:
- loss;
- burst;
- minimum round trip time;
- maximum round trip time;
- average round trip time;
- one-way delay; and
- one-way delay variability.

* * * * *